United States Patent [19]

Clements

[11] Patent Number: 4,658,146
[45] Date of Patent: Apr. 14, 1987

[54] EXTENDED CAVITY LASER READOUT APPARATUS

[75] Inventor: Ken Clements, Santa Cruz, Calif.

[73] Assignee: Laser Dynamics Inc., Santa Clara, Calif.

[21] Appl. No.: 709,267

[22] Filed: Mar. 7, 1985

[51] Int. Cl.$^4$ .............................................. G06K 7/10
[52] U.S. Cl. .................................... 250/566; 369/120
[58] Field of Search ............... 250/570, 566, 568, 569; 369/120, 122, 13, 14; 356/352

[56] References Cited

U.S. PATENT DOCUMENTS 3,619,516 12/1971 Miller et al. ........................ 369/122
3,941,945 3/1976 Borner et al. ........................ 369/120
4,005,259 1/1977 Kaneko ............................ 369/120
4,452,533 6/1984 Miles ................................. 356/352

Primary Examiner—David C. Nelms
Assistant Examiner—S. Allen
Attorney, Agent, or Firm—Fliesler, Dubb, Meyer & Lovejoy

[57] ABSTRACT

An apparatus for reading a recorded medium using an extended cavity laser in which the recorded medium is an integral part of the laser cavity. Recorded mediums for producing a Kerr effect, differentially reflective mediums and mediums capable of undergoing stimulated emissions are disclosed.

22 Claims, 10 Drawing Figures

EXTENDED CAVITY LASER READOUT APPARATUS

BACKGROUND OF THE INVENTION

1. Field of the Invention

The present invention relates to apparatus for reading a recorded medium in general and to an apparatus comprising a laser having an extended cavity which includes a recorded medium for reading the medium in particular.

2. Description of Prior Art

A variety of apparatus comprising a laser for reading data from a recorded medium has been proposed and many are used. For example, magnetooptic laser readout devices have been designed to operate by either the Kerr or Faraday effects. Both types require the detection of a small change in the polarization characteristic of polarized light that interacts with magnetic domains of a recorded magnetic medium. In the case of the Kerr effect, a polarization change is detected in light that is reflected from a magnetic surface. For the Faraday effect, the light is passed through a transparent or semi-transparent magnetic material in which, again, the polarization angle of the wavefront is changed based on the orientation of magnetic domains.

In another prior known laser reading apparatus, changes in the reflectivity of the surface of a recorded medium, which changes correspond to data recorded on the medium, are detected using a semiconductor laser both as a light source and as a detector.

Enclosed herewith is a set of drawings in which FIGS. 1 and 2 are block diagrams of embodiments of the prior known apparatus described above for reading a recorded disk using laser light. In FIG. 1 there is shown a prior known Kerr effect magnetooptic reading apparatus. In FIG. 2 there is shown a prior known reflectivity responsive reading apparatus.

Referring to FIG. 1, there is provided in the prior known Kerr effect magnetooptic reading apparatus a source of laser light 101, a collimating lens 102, a beam splitter 103, a focusing lens 104, an apparatus for positioning the lens 104 in an R-Z plane as shown by crossed arrows 105 on a magnetic medium comprising an active magnetic layer 106 on a disk 107 having a transparent overcoat 108 and an apparatus for rotating the disk 107 as shown by the arrow 109, and a polarization analyzer system 120. The system 120 comprises a polarizing beam splitter 111, a pair of lenses 112 and 114, a pair of light detectors 113 and 115 and a differential amplifier 116.

In operation, laser light that is plane polarized to a very high degree is collimated at lens 102, passes through the beam spltter at 103 and is then positioned and focused by lens 104, by means of the movement system 105, onto the active layer 106 of the disk 107. The laser light is then reflected from the layer 106. The reflected light proceeds back through the optics 104 and 103 where it is directed to the polarization analyzer system 120. At the analyzer system 120, the polarizing beam splitter 111 separates the polarization components of the reflected light after which the lenses 112 and 114 focus the light on detectors 113 and 115 respectively. The outputs of the detectors then become the inputs to a differential amplifier 116 whose output will thus change with a change of polarization rotation at the surface 106.

Although the laser source 101 could be made very small, the optics and the focusing mechanism of the above-described prior known magnetooptic readout apparatus is very large. Furthermore, the limits imposed by diffraction in the lenses limit the maximum bit density that can be resolved, and therefore read back.

Referring to FIG. 2, there is provided in the prior known disk reflectivity responsive reading apparatus a semiconductor laser diode 201, an adjustable laser bias current circuit 215 comprising a battery 208 and a variable resistor 209, a capacitor 210, a lead 206 for coupling to a detector of laser voltage, a pair of lenses 202 and 203, a photodetector 204 for receiving light from a rear facet of the diode 201, a phase randomizing plate 211, and a recorded medium 207 comprising reflective and non-reflective areas corresponding to data stored thereon.

In operation, light from the laser diode 201, with bias current provided by bias circuit 215, is collimated at lens 202, phase randomized at plate 211, and focused with lens 203 on the recorded medium 207. Changes in the magnitude of the light reflected from the recorded medium are detected by either a change in laser voltage at lead 206, or by a change in laser light from the rear facet of the laser 201 at the photodetector 204.

While the last described apparatus has the advantage of using the laser as both the light source and a detector, it still suffers from the problems of focusing and the diffraction limitations described above with respect to the embodiment of FIG. 1.

In general, it is important to note that in none of the above-described prior known laser reading apparatus is the recorded medium an integral part or component of the laser optical cavity.

An apparatus in which an external reflective member is an integral part or component of the laser optical cavity has been disclosed by R. O. Miles, A. Dandridge, A. B. Tveten and T. G. Giallorenti in their article "An External Cavity Diode Laser Sensor", which appeared in the *Journal of Lightwave Technology*, Vol. LT-1, No. 1, March 1983. In this apparatus, forming a semiconductor laser sensor, a front facet of a diode laser is arranged to be held within a few wave lengths of a reflective member. As the reflective member is perturbed, even slightly, the phase of the light reflected back into the laser cavity is altered thus varying the effective laser facet reflectivity. The change in laser output is detected as a measure of the distance the reflective member moves relative to the exit facet of the laser.

While the article describes an external or extended cavity laser in which a reflective member is an integral part of the laser cavity, the description is restricted to an apparatus responsive to phase changes in reflected light in the optical cavity. There is no disclosure or suggestion of any use of such a laser for reading data from a recorded medium of any kind.

SUMMARY OF THE INVENTION

In view of the foregoing, a principal object of the present invention is an apparatus comprising an extended or external cavity laser in which an information bearing medium is maintained within or intercepts the standing wave generated within the laser cavity and thus is an integral part of the laser cavity. Information is recorded on the medium by altering the surface of the medium.

In one embodiment of the invention, the medium surface is altered by alternately polarized magnetic domains which interact with the laser standing wave to produce a Kerr effect rotation of the polarization of the laser light. The polarization shift in turn affects the gain of the laser and thus its lasing mode and threshold. In this embodiment, the medium is maintained at or within a few wave lengths of the exit facet of the laser.

In another embodiment of the invention utilizing the Kerr effect, the medium is maintained at or within a few wavelengths of the exit face of a light guide closely coupled to the exit facet of the laser.

In another embodiment of the invention utilizing the Kerr effect, a reflective magnetic layer capable of producing a Kerr effect is coated on the exit facet of the laser. In this embodiment, the orientation of magnetic domains in the medium, whether or not capable of producing a Kerr effect, "print" through the magnetic layer to alter the Kerr effect produced by the magnetic layer.

In another embodiment of the invention utilizing the Kerr effect, a magnetic domain is located on the rear exit facet of a semiconductor laser to provide a Kerr effect bias.

In another embodiment utilizing the Kerr effect, a differential polarization analyzer is used for detecting very small degrees of rotation of the polarization due to the Kerr effect.

In another embodiment of the invention, the surface of the recorded medium is altered by changes in the reflectivity of the surface which in turn affects the gain of the laser and thus its lasing mode and threshold.

In another embodiment of the invention, the medium surface is altered by materials which absorb laser light and undergo stimulated emissions. Materials which are capable of supporting a number of laser modes are used for storing multiple bits of information at a given location. A spectrum analyzer is provided for detecting each mode and reading the multiple bits.

In another embodiment of the invention, there is provided a tunable cleaved coupled cavity laser. With a medium having a surface comprising materials capable of supporting a number of laser modes, multiple bits are stored at a given location and can be selectively read by tuning the laser.

In general, the invention contemplates the use of a semiconductor laser or an array of semiconductor lasers in apparatus as described above. Such apparatus would allow an increase in bit density and, in the laser array form, allow many tracks of a recorded medium to be read out simultaneously.

BRIEF DESCRIPTION OF THE DRAWING OF EMBODIMENTS OF PRESENT INVENTION

The above and other objects, features and advantages of the present invention will become apparent from the following detailed description of the accompanying drawing in which.

DETAILED DESCRIPTION OF THE INVENTION

Figure 1:
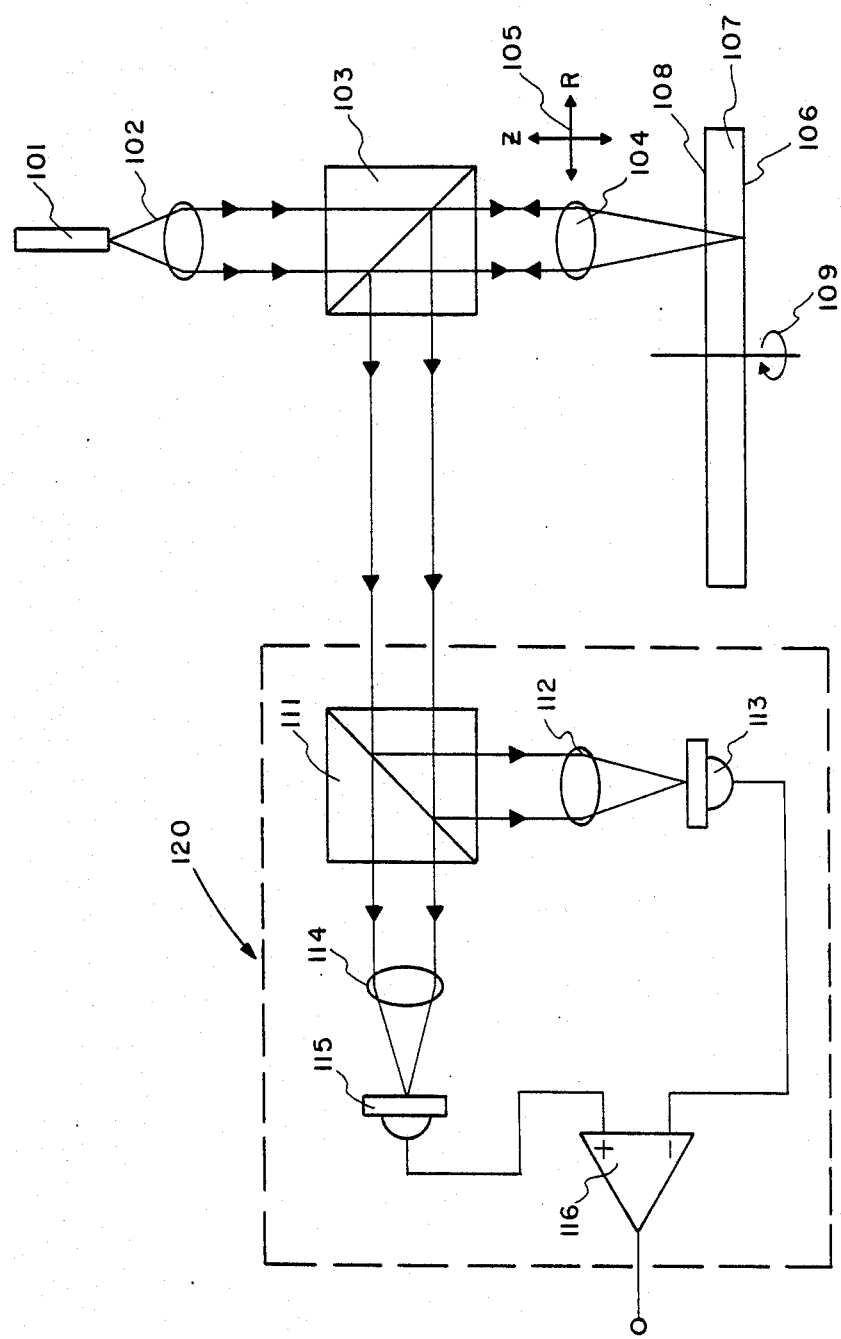
Figure 2:
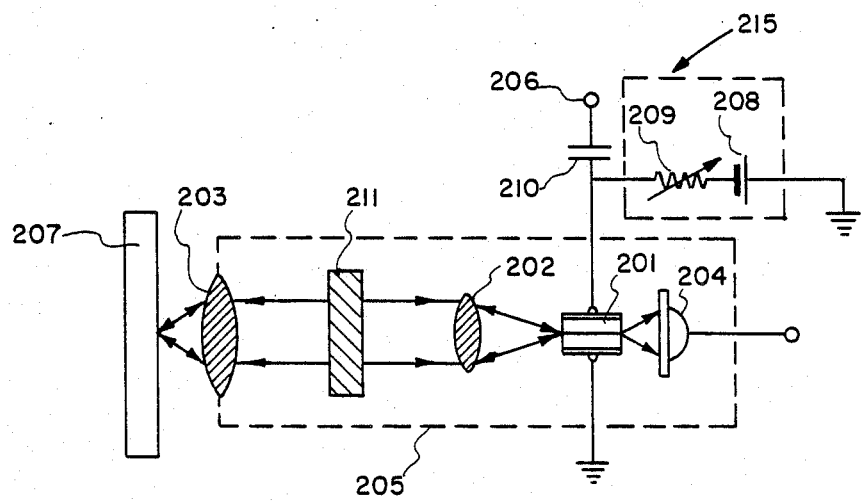
Figure 3A:
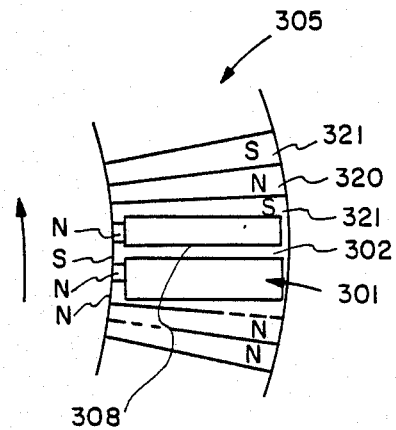
FIG. 3A is a partial plan view of a recorded medium and laser according to the present invention.
Figure 3:
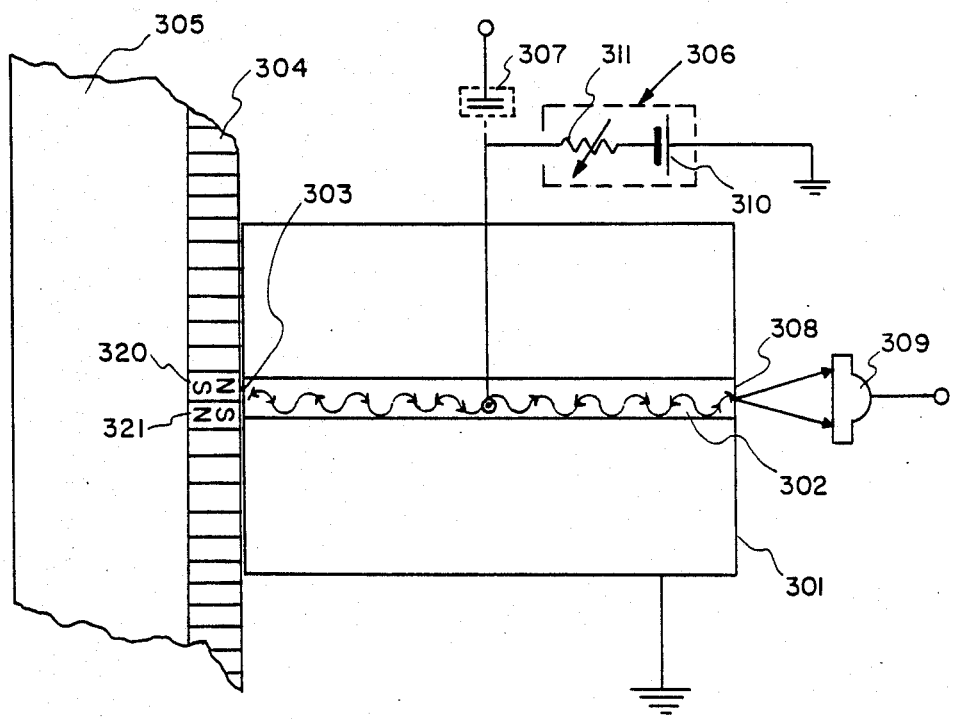
FIG. 3 is a block diagram of a magnetooptic readout apparatus according to the present invention.

Referring to FIGS. 3 and 3A, there is provided in accordance with the present invention a semiconductor laser diode 301. The diode 301 comprises an active region (optical cavity) 302 which is located between a front facet 303 and a rear facet 308. In practice, the front facet 303 of the laser 301 is positioned at or within a few microinches of a magnetic layer 304 that is supported by a substrate 305. An adjustable current source 306 comprising a battery 310 and a variable resistor 311 is provided to supply injection current to the laser 301. Signal pickup points are provided by either a junction voltage pickoff arrangement 307 or by a photodetector 309 which is positioned so as to monitor the light output from the rear facet 308 of the laser.

In a preferred embodiment of the invention, the substrate 305 is an aluminum or plastic disk with perpendicularly oriented magnetic N-S and S-N domains 320, 321 in the layer 304. The layer 304 may be fabricated by coating the substrate 305 with the magnetic layer 304 as by plating, sputtering or other means. The number, width and sequence of the domains 320, 321 are determined by any suitable recording apparatus which is compatible with the front facet 303 of the laser 301.

In practice, the laser 301 is located in a flying or contact read head that is positioned to readout circular tracks on the disk surface. The laser 301 is oriented in the head such that its optical cavity 302 is perpendicular to the surface of the disk, with the long axis of the front facet 303 oriented radially, as shown in FIG. 3A. Therefore, the narrow dimension of the front facet 303 gives the maximum resolution linearly in the track.

In operation, with the front facet 303 centered on a track as shown in FIG. 3A, the disk 305 is rotated, the magnetic domains 320 and 321 pass sequentially beneath the facet 303, and laser light is reflected from the surface of the domains causing a standing wave of light having a predetermined polarization to be established in the active region 302. As the domains passing beneath the facet 303 change from a vertically oriented N-S domain 320 to a S-N domain 321 or vice versa, there is a shift or rotation in the polarization of the reflected light relative to the incident light. This shift results in a change in the magnitude of the standing wave in the active region which is detected as a change of potential across capacitor 307 and/or a change in the output of the photodetector 309. As will be further described, the change in the magnitude of the standing wave is due to the fact that each semiconductor laser has a preferred polarization, a deviation from which affects the magnitude of the standing wave.

Typical materials used to produce the magnetic surface suffer from Kerr rotations of only a few tenths of a degree, making discrimination of bit state very difficult using prior known methods and apparatus, although prior art has used coating layers at the surface of the magnetic medium to increase the Kerr effect.

The embodiment of FIG. 3 represents a large advance over prior art methods and apparatus because the wavefront traveling back and forth from the rear laser facet 308 through the active cavity 302 and then reflecting from the magnetic surface 304, will experience a cumulative Kerr rotation which is a function of the number of round trips. As mentioned above, for most types of semiconductor injection lasers, the laser emission is strongly plane polarized in the Transverse Electric (TE) mode with respect to the active layer of the diode. Wavefronts rotated out of this mode experience very little gain and therefore tend not to participate in the stimulated emission.

When the laser facet 303 is directly over a vertically oriented magnetic domain the majority of the light in the active region of the laser is stepwise reoriented by this cumulative polarization rotation until the losses involved exceed the gain from stimulated emission. This has the effect of reducing the Q of the laser and, therefore, requires the increase of injection current in order to maintain laser operation. However, when the facet 303 is directly over a boundary between magnetic domains the average Kerr rotation will be nil and the laser will operate at its best Q value.

The injection current supply represented by 306 is adjusted so as to provide enough current to sustain laser operation when the average Kerr rotation is very small. This produces a Q switched laser system such that the laser will switch in and out of lasing mode operation as the surface 304 is moved to bring changing magnetic domains under the facet 303. Thus information encoded as the timing between domain changes can be recovered by monitoring laser operation.

As described above, two means of monitoring the laser operation are represented in FIG. 3. One is by the photodetector 309 that is mounted at the rear of the laser to detect the light output of the rear facet 308. When lasing mode operation is active, the output of the photodetector 309 will experience a sharp increase. The other means is the electrical pickup 307 that monitors the change in junction voltage that occurs as the laser goes into and out of lasing mode. In either case the signals produced are much stronger than can be achieved in a system that relies on a single reflection from the magnetic surface.

Another important feature of the embodiment of FIG. 3 is that the exit facet 303 of the laser 301 can be made very small and therefore can result in very high resolution readout. These facets are normally approximately as wide as their operating wavelength, but are only as high as the diode active layer is thick, and in some cases this layer is narrowed to a few tenths of a wavelength. This is of significance because systems based on the focusing of light by means of lenses are limited in their abilities to resolve distances less than their wavelength due to the limitations of diffraction.

Figure 4:
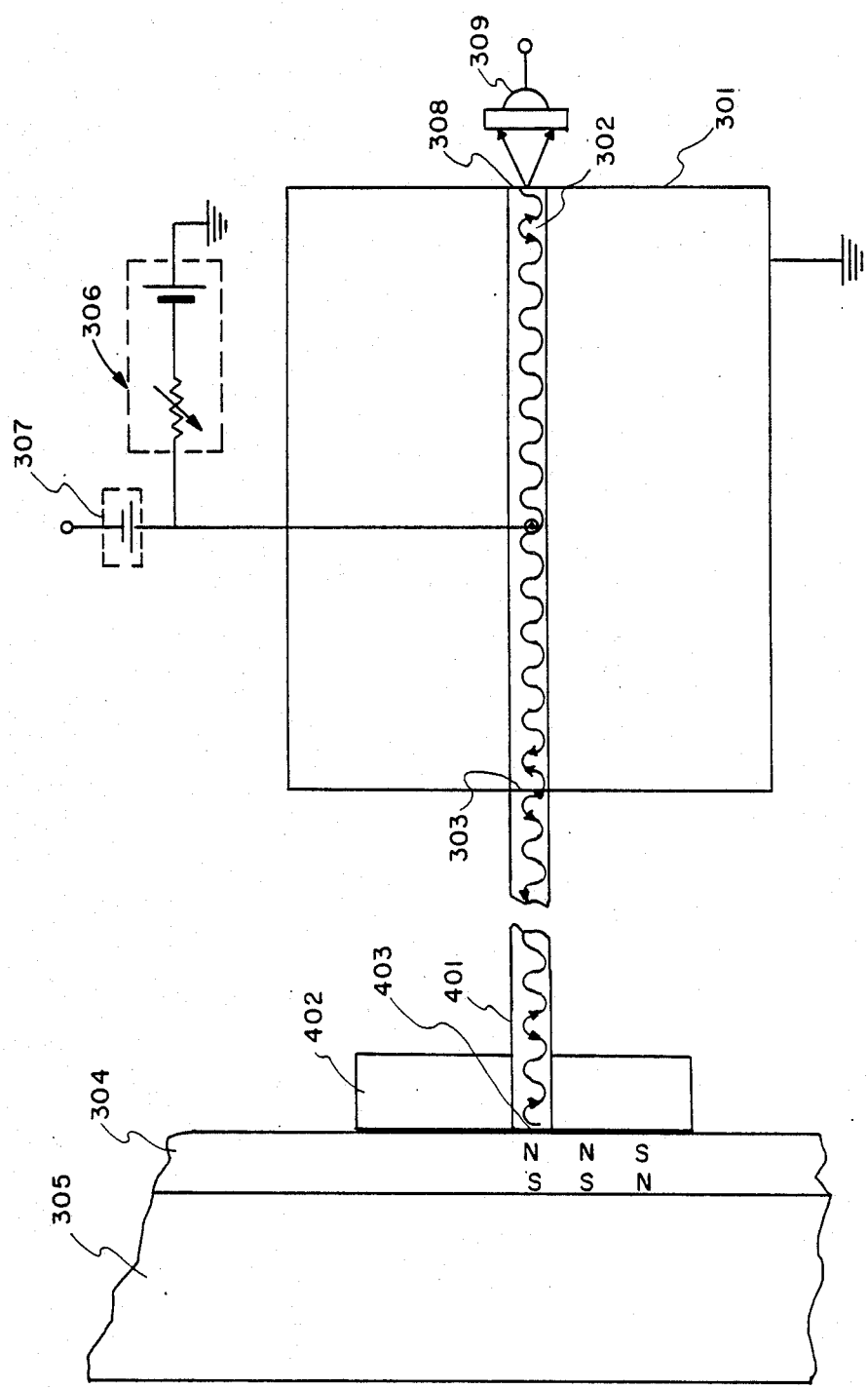
FIG. 4 is a block diagram of another embodiment of the present invention in which the optical cavity of a laser is extended by means of a light guide or optic fiber.

Referring to FIG. 4, there is provided in a modification of the apparatus of FIG. 3 a light guide 401, such as an optic fiber, and a light guide holding and positioning apparatus 402. One end of the guide 401 is coupled directly to the facet 303 of the diode 301 and the opposite end of the guide 401, designated 403, is positioned very close to or in contact with the surface of the magnetic layer 304.

The guide 401 is provided for mounting the diode 301 at a location remote from the layer 304. The apparatus 402 is provided for holding and positioning the end 403 of the guide 401 relative to the recorded tracks in the layer 304.

In operation, the embodiment of FIG. 4 is functionally the same as the embodiment of FIG. 3.

Figure 5:
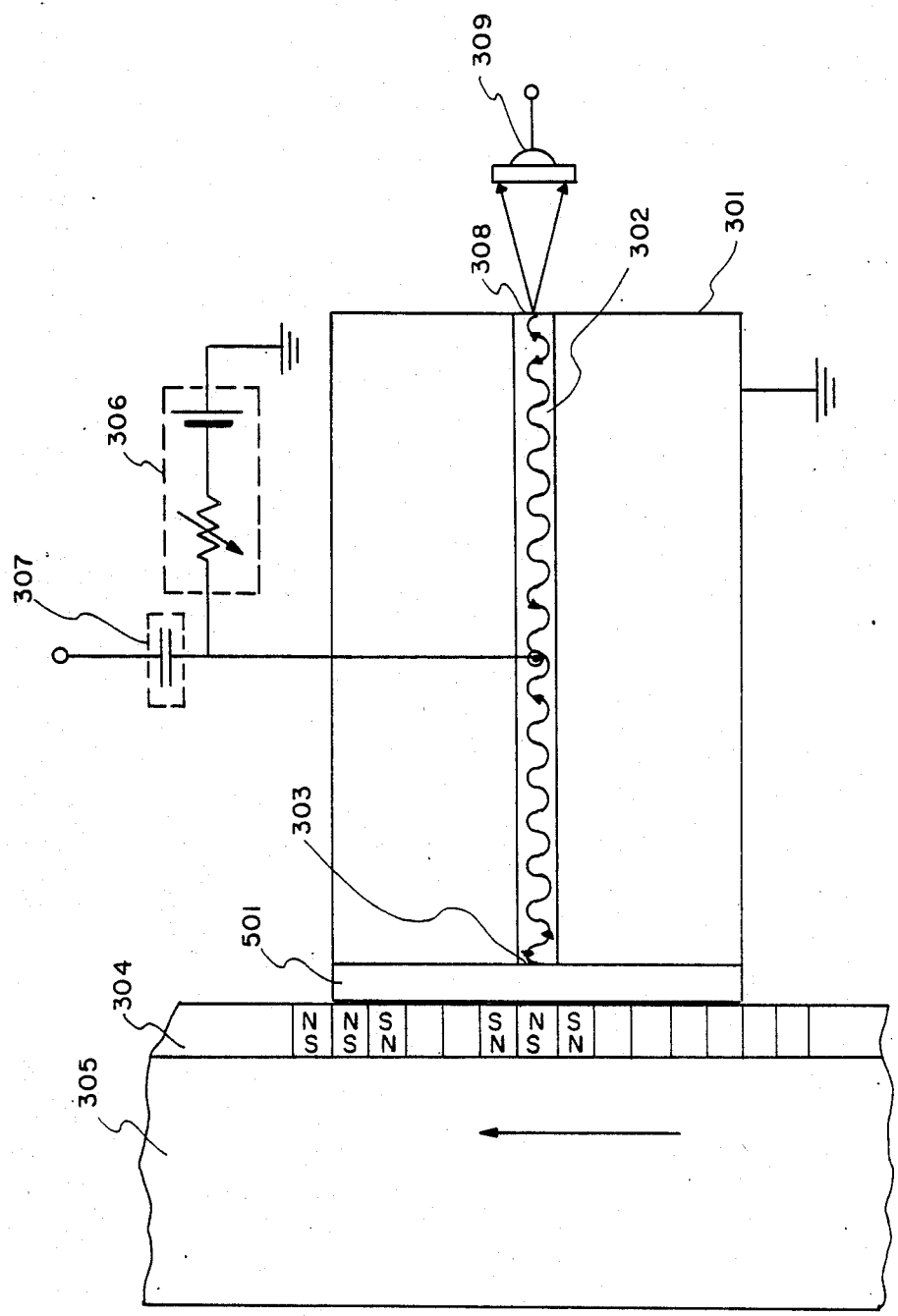
FIG. 5 is a block diagram of another embodiment of the present invention in which a magnetic layer capable of providing a Kerr effect rotation is used to enable the reading of various types of recorded magnetic medium.

Referring to FIG. 5, there is provided in a modification of the apparatus of FIG. 3, a magnetic detection coating 501 which is applied to the front end and facet 303 of the laser diode 301 so as to reflect the light at the front facet 303 before it propagates to the media 304. Preferably, the coating 501 has a very low magnetic coercivity, but high Kerr rotation and comprises a one micron layer of cobalt.

In operation, when the layer 501 is brought close to or in contact with the magnetic surface 304, the magnetic domains of 304 will "print through" to the interior surface of coating 501 and thereby effect a shift in the polarization of the light reflected from the surface. Thus the laser with its optical cavity extended to include the coating 501 is a general purpose magnetic sensor and can detect a change in domain orientation of surface 304 due to the motion of surface 304 even though the material of surface 304 may not be reflective and/or have no Kerr rotation.

Figure 6:
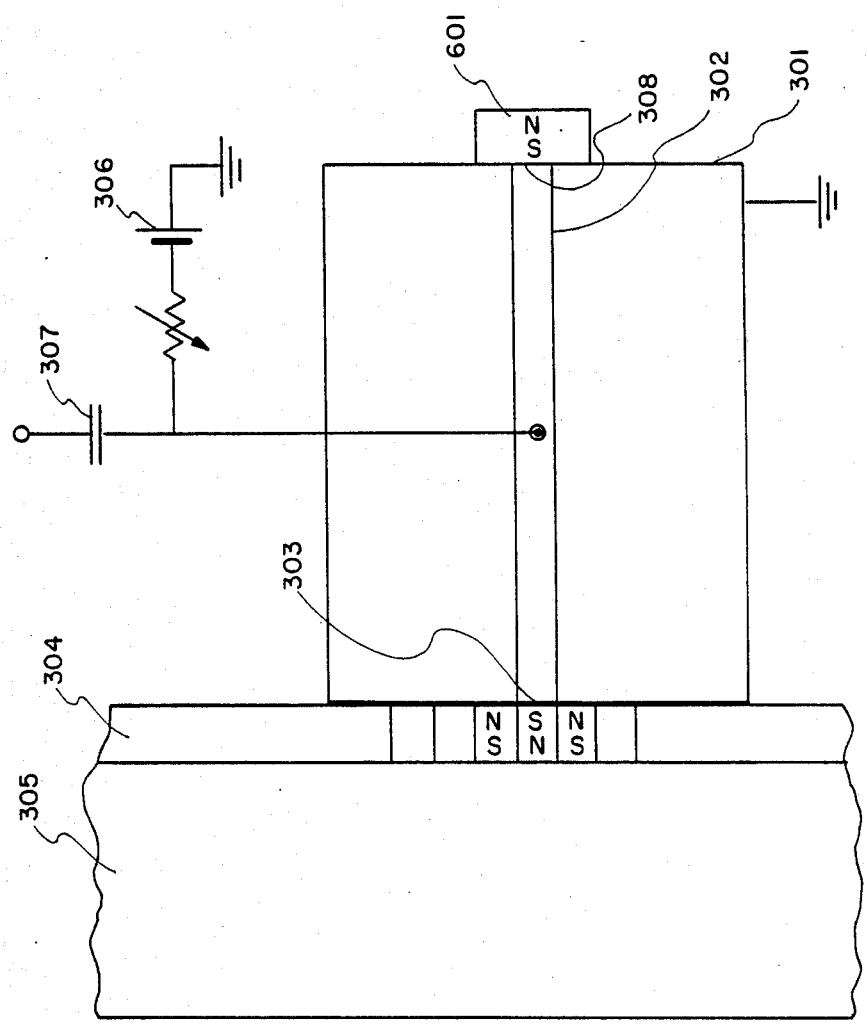
FIG. 6 is a block diagram of another embodiment of the present invention comprising means for providing a Kerr effect rotational bias.

Referring to FIG. 6, in a modification of the apparatus of FIG. 3, the photodetector 309 is removed and a magnetized coating 601, comprising for example a one micron thick layer of cobalt, is placed over the rear facet 308 of the laser 302. The coating 601 provides a bias polarization rotation for light in the optical cavity 302.

The embodiment of FIG. 6 may be used to read out the value of a single static magnetic domain. Its operation is much the same as the apparatus of FIG. 3 except that the photodetector 309 has been replaced by the magnetic surface 601. This surface is of the same material and therefore has the same Kerr rotation characteristics as the magnetic surface 304. The surface 601 is mounted directly to the rear facet 308 such that the laser optical cavity is extended to include it, as is the corresponding case with the front facet and the magnetic surface 304. The surface 601 has been magnetized with a single magnetic domain oriented perpendicular to its surface.

The operation of the apparatus of FIG. 6 is such that when the Kerr rotations of surfaces 304 and 601 add the laser is not able to sustain lasing mode and, therefore, shuts down. However, when the Kerr rotation of surface 601 reverses the rotation of surface 304, the average polarization mode remains unchanged for a cavity round trip, and the laser Q is high enough (with proper injection current) to sustain stimulated emissions.

In practice, the operation of the laser 301 is monitored at 307 in those cases in which material 601 is opaque. However, the optical pickup 309 could be used if a birefringence coating on the rear facet 308 is used in place of the magnetic material 601. The coating would, however, be required to introduce the same degree of polarization rotation as the magnetic surface 304. The same condition would apply to balance the Kerr rotation of the intermediate magnetic surface 501 described above with respect to FIG. 5.

Figure 7:
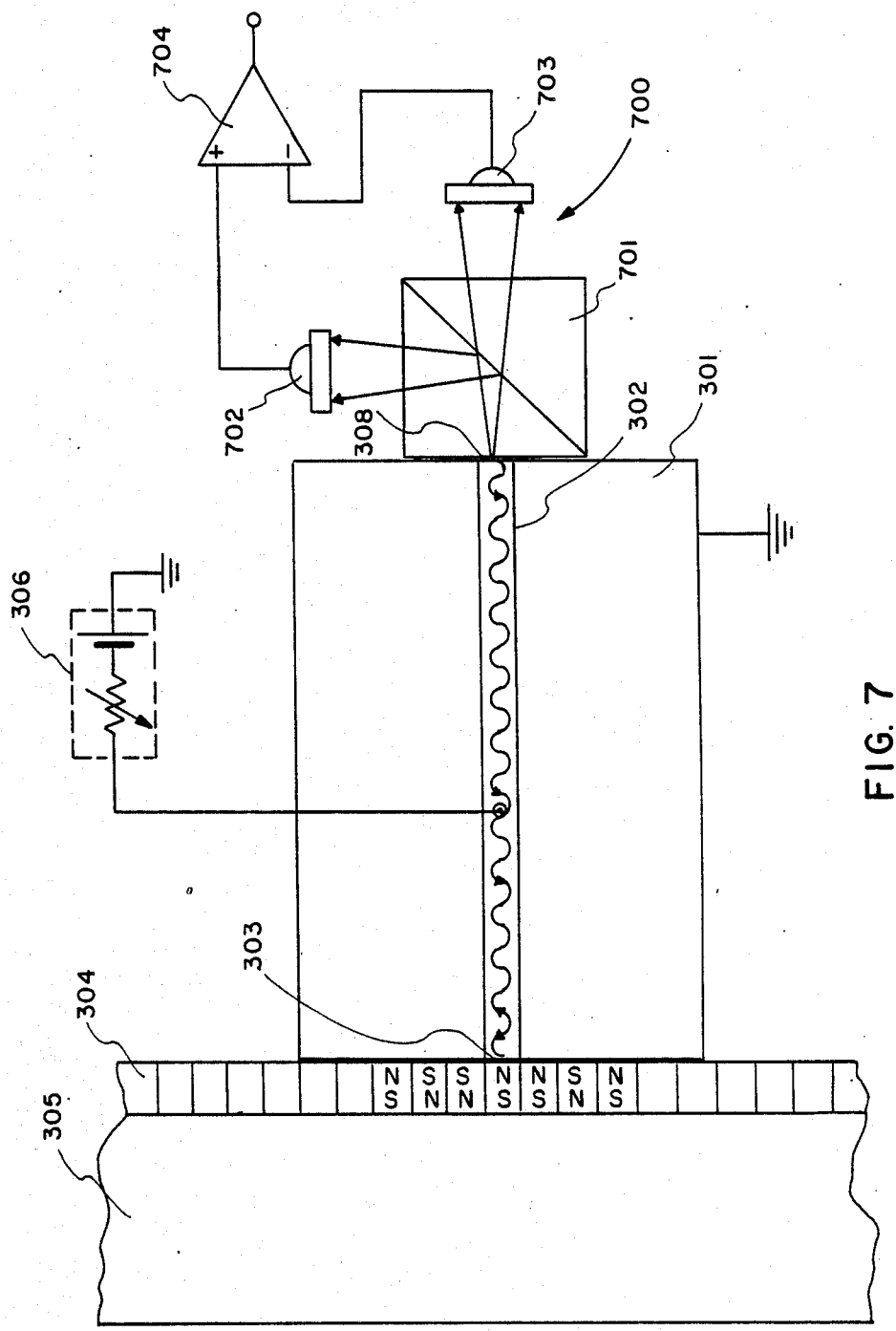
FIG. 7 is a block diagram of another embodiment of the present invention comprising a differential polarization analyzer for analyzing the exit light from a back facet of a laser.

Referring to FIG. 7, in a modification of the apparatus of FIG. 3, the capacitor 307 and the photodetector 309 which are provided for detecting Kerr effect produced changes in the polarization of the light in the optical cavity 302 are replaced by a conventional differential polarization analyzer designated generally as 700 comprising a polarizing beam splitter 701, a pair of photodetectors 702 and 703 and a differential amplifier 704.

In operation, since the present invention provides a means for the amplification of the Kerr rotation of surface 304 before the action of the beam splitter 701, very small degrees of rotation of the polarization due to the Kerr effect can be resolved when combined with a conventional analyzer.

Figure 8:
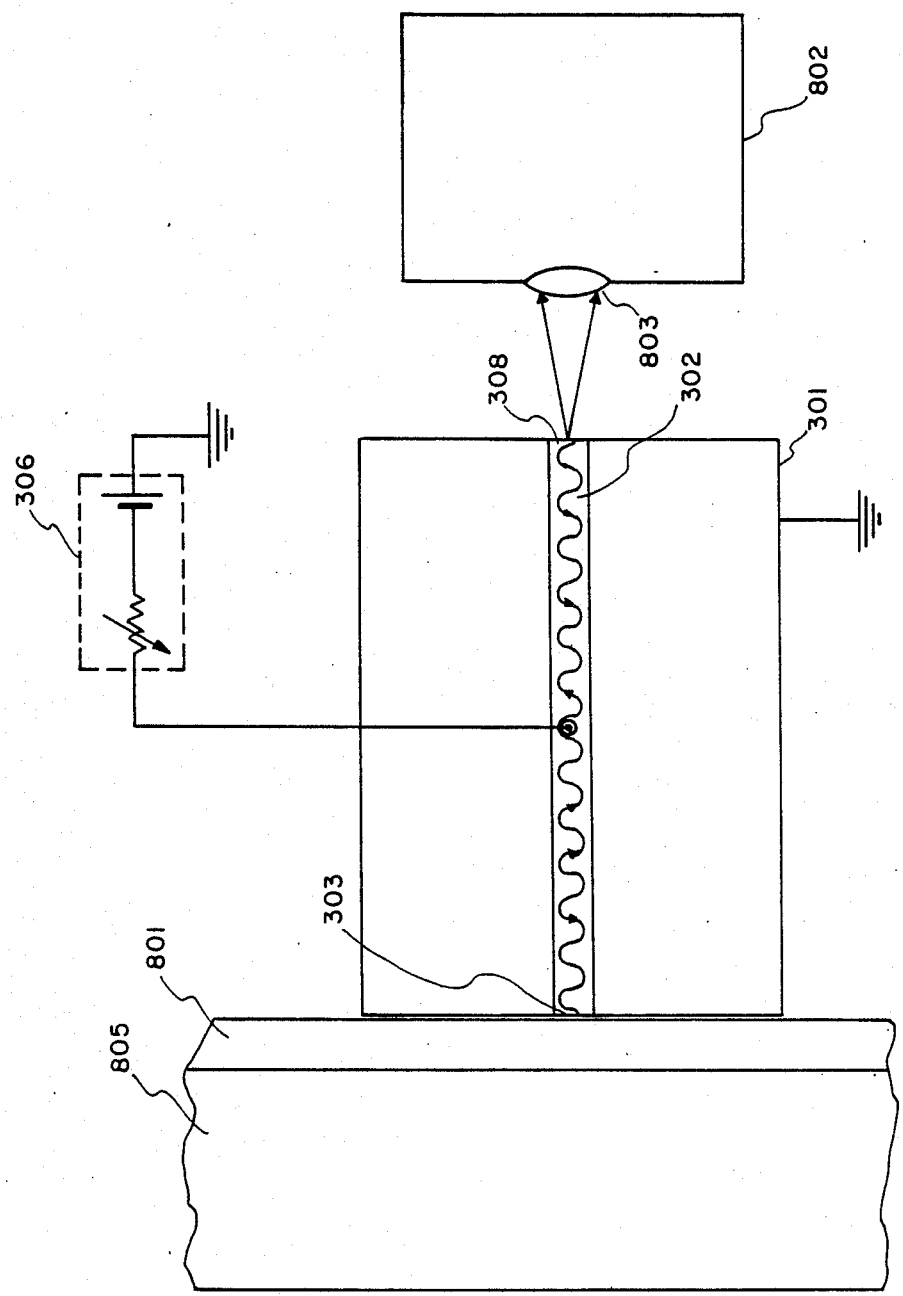
FIG. 8 is a block diagram of another embodiment of the present invention comprising an optical spectrum analyzer for analyzing the exit light from a back facet of a laser.

In the discussion of FIG. 3–FIG. 7, the emphasis has been placed on the use of the present invention for Kerr effect amplification. FIG. 8 shows an embodiment which is also useful in the readout of an optical disk.

Referring to FIG. 8, an information carrying surface 801 is designed such that its reflectivity corresponds to the data stored therein and alters the operation of the laser as bits are moved under the front facet 303 of the semiconductor laser 301. For proper injection current the system will again form a Q switched laser and the pickup arrangement of FIG. 3 will provide signals at pickups 307 or 309 (not shown) that can be used to recover the data.

In a modification of the embodiment of FIG. 8 which provides for an even greater data density, the material of the surface 801 is chosen such that it absorbs energy from the laser 301 and then, using the optical cavity 302, undergoes stimulated emissions. With this arrangement, the system would be a multimode system and thus the output would be detected by an optical spectrum analyzer 802. The object of this embodiment is a system in which the material 801 is able to support a number of lasing modes, and thus allow more than one bit to be read from each point on the surface.

In practice, light from the rear facet 308 of the diode 301 is provided at the input of the analyzer 802 by means of a lens 803. Alternatively, light from the facet 308 may be provided at the input of the anlyzer 802 by means of an optic fiber (not shown).

Figure 9:
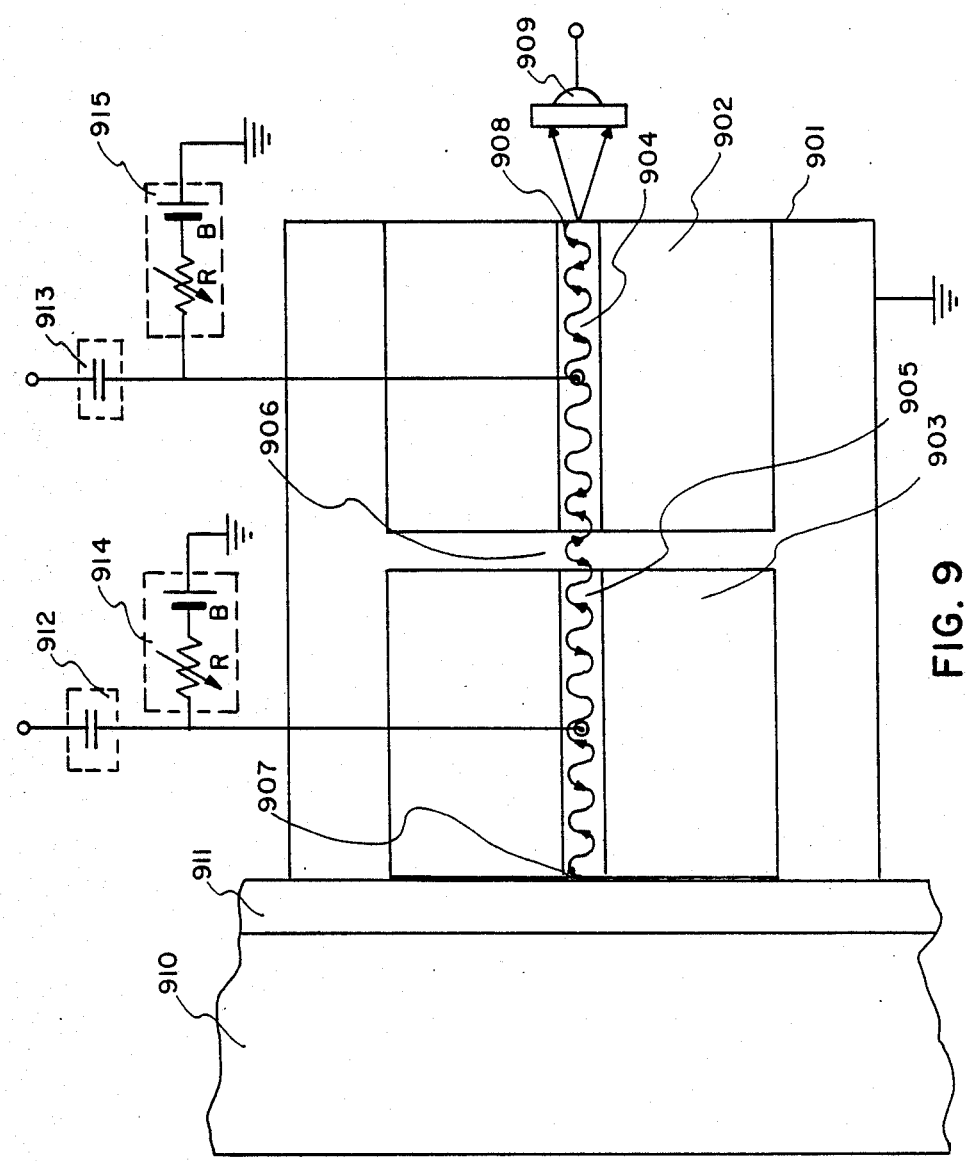
FIG. 9 is a block diagram of another embodiment of the present invention comprising a cleaved coupled cavity laser for providing a spectral line selection capability.

Referring to FIG. 9, in a modification of the apparatus of the preceding FIGS. 3–8, a recorded medium 910 is provided with a layer 911. Data is stored in the layer 911 by means of a plurality of materials, each capable of undergoing stimulated emissions in response to incident light of a predetermined frequency. The single cavity laser diode 301 is replaced by a cleave coupled cavity laser diode 901 having a front facet 907. The diode 901 comprises a pair of diodes 902 and 903 having optical cavities 904 and 905, respectively, separated by a coupling gap 906.

In operation, the diodes 902 and 903 are tuned by a pair of injection current control circuits 915 and 914, respectively, each comprising a battery B and a variable resistor R. By tuning the laser 901, selected ones of the plurality of materials in the layer 911 can be made to lase, thereby providing a means for recovering the data stored therein.

From the foregoing descriptions of several embodiments of the invention, it should now be apparent that the key concept involved in the operation of the invention is the extension of the optical cavity of the semiconductor laser to include a medium on which data is stored. Unlike prior art, the extension of the optical cavity allows the physical characteristics of the information carrying medium to be involved in the light amplification process of the laser. This gives the invention signal gain at the point in the readout process before the information carrying light is converted into an electric signal.

While the invention has been particularly shown and described with reference to the preferred embodiment thereof, it will be understood by those of skill in the art that various changes in form and details may be made therein without departing from the spirit and scope of the invention as defined by the claims hereinafter provided.

What is claimed is:

1. An extended cavity laser readout apparatus for reading data from a recorded medium comprising:

a laser means having an active region for producing stimulated emissions of radiation having a preferred polarization and a magnetic medium having said data recorded thereon which co-act to produce a standing wave of said radiation which extends through said active region to the surface of said magnetic medium, said data recorded on said magnetic medium comprising a plurality of magnetic domains, each of which produces a Kerr effect rotation of the polarization of said standing wave which, in cooperation with said preferred polarization of said standing wave, changes the amplitude of said standing wave;

means for moving said magnetic domains in said recorded medium in a transverse direction relative to said standing wave; and means for detecting said changes in amplitude of said standing wave as said magnetic domains are moved relative to said standing wave.

2. An apparatus according to claim 1 wherein said laser means comprises a light guide located between said active region and said recorded medium for supporting said standing wave between said active region and said recorded medium.

3. An apparatus according to claim 2 wherein said light guide comprises an exit facet adjacent to said recorded medium and said laser means comprises means for maintaining the position of said exit facet relative to said recorded medium so as to support said standing wave between said exit facet and said recorded medium.

4. An apparatus according to claim 2 wherein said light guide comprises an optic fiber.

5. An apparatus according to claim 1 wherein said laser means comprises a current source and said detecting means comprises means responsive to changes in current from said source.

6. An apparatus according to claim 1 wherein said laser means comprises a rear exit facet for transmitting light from said laser and said detecting means comprises means responsive to light transmitted from said rear exit facet.

7. An apparatus according to claim 6 wherein said light responsive means comprises a photodetector.

8. An apparatus according to claim 6 wherein said responsive means comprises a beam splitter for splitting light having a first polarization from light having a second polarization;

a first and a second photodetector, each responsive to one of said first and said second polarizations; and a differential amplifier coupled to the outputs of said first and said second photodetectors for providing a signal corresponding to the difference in the magnitude of the light having said first and said second polarizations.

9. An apparatus according to claim 6 wherein said detecting means comprises a spectrum analyzer.

10. An apparatus according to claim 1 wherein said active region comprises a longitudinal axis and a generally rectangular cross-section and each of said magnetic domains comprises a north and a south pole which are aligned perpendicular to the surface of said recorded medium and parallel to said longitudinal axis of said active region and a rectangular cross-section which corresponds in size to the size of the rectangular cross-section of said active region.

11. An apparatus according to claim 1 wherein said active region comprises a longitudinal axis and a generally rectangular cross-section, each of said magnetic domains comprises a longitudinal axis and a generally rectangular cross-section, said cross-section of said active region and each of said magnetic domains has a long axis, and said moving means comprises means for moving the long axis of said cross-section of said magnetic domains in a direction perpendicular to the long axis of said cross-section of said active region.

12. An apparatus according to claim 1 wherein said active region comprises a layer of magnetic material covering one end of said active region, said layer comprising means for reflecting light into said active region and a magnetic domain for producing a Kerr effect rotation of the polarization of the light reflected into said active region.

13. An apparatus according to claim 12 wherein said one end of said active region comprises the end of said active region located closest to said recorded medium and said recorded medium comprises magnetic domains which have the capacity for affecting said Kerr effect rotation produced by the magnetic domain in said layer.

14. An extended cavity laser readout apparatus for reading data from a recorded medium comprising:
a laser means having an active region for producing stimulated emissions of radiation and a medium spaced from said active region having said data recorded thereon which co-act to produce a standing wave of said radiation which extends through said active region to the surface of said recorded medium, said data recorded on said medium comprising areas of material which produce stimulated emissions in response to said radiation;
means for moving said areas in said medium in a transverse direction relative to said standing wave; and
means for detecting said stimulated emissions produced by said areas as said areas are moved relative to said standing wave.

15. An apparatus according to claim 14 wherein said stimulated emissions comprise a plurality of frequencies and said detecting means comprises means for selectively detecting the stimulated emission at each of said plurality of frequencies.

16. An apparatus according to claim 15 wherein said detecting means comprises a spectrum analyzer.

17. An apparatus according to claim 14 wherein said laser means comprises a tunable cleaved coupled cavity laser for selectively generating a plurality of standing waves.

18. An apparatus according to claim 17 wherein said recorded medium comprises material capable of producing stimulated emissions in response to each of said plurality of standing waves.

19. A method of reading data from a recorded medium comprising the steps of:
providing said recorded medium with said data comprising a plurality of magnetic domains, each of said domains producing a Kerr effect rotation of the polarization of a standing wave which, in conjunction with a preferred polarization of said standing wave, changes the amplitude of said standing wave;
generating a standing wave of stimulated emissions having said preferred polarization which extends to the surface of said recorded medium;
moving said recorded medium in a transverse direction relative to said standing wave; and
detecting said changes in amplitude of said standing wave as said recorded medium is moved in said transverse direction relative to said standing wave.

20. A method according to claim 19 wherein said laser means comprising an active region and a light guide located between said active region and said recorded medium for supporting said standing wave between said active region and said recorded medium.

21. A method according to claim 20 wherein said light guide comprises an exit facet adjacent to said recorded medium and said laser means comprises means for maintaining the position of said exit facet relative to said recorded medium so as to support said standing wave between said exit facet and said recorded medium.

22. A method of reading data from a recorded medium comprising the steps of:
providing said recorded medium with said data comprising a plurality of areas of material capable of producing stimulated emissions in response to a standing wave of stimulated emissions;
generating said standing wave of stimulated emissions which extends to the surface of said recorded medium;
moving said recorded medium in a transverse direction relative to said standing wave; and
detecting said stimulated emissions induced in said areas of material of said recorded medium by said standing wave as said recorded medium is moved in said transverse direction relative to said standing wave.

* * * * *